United States Patent Office 2,974,732
Patented Mar. 14, 1961

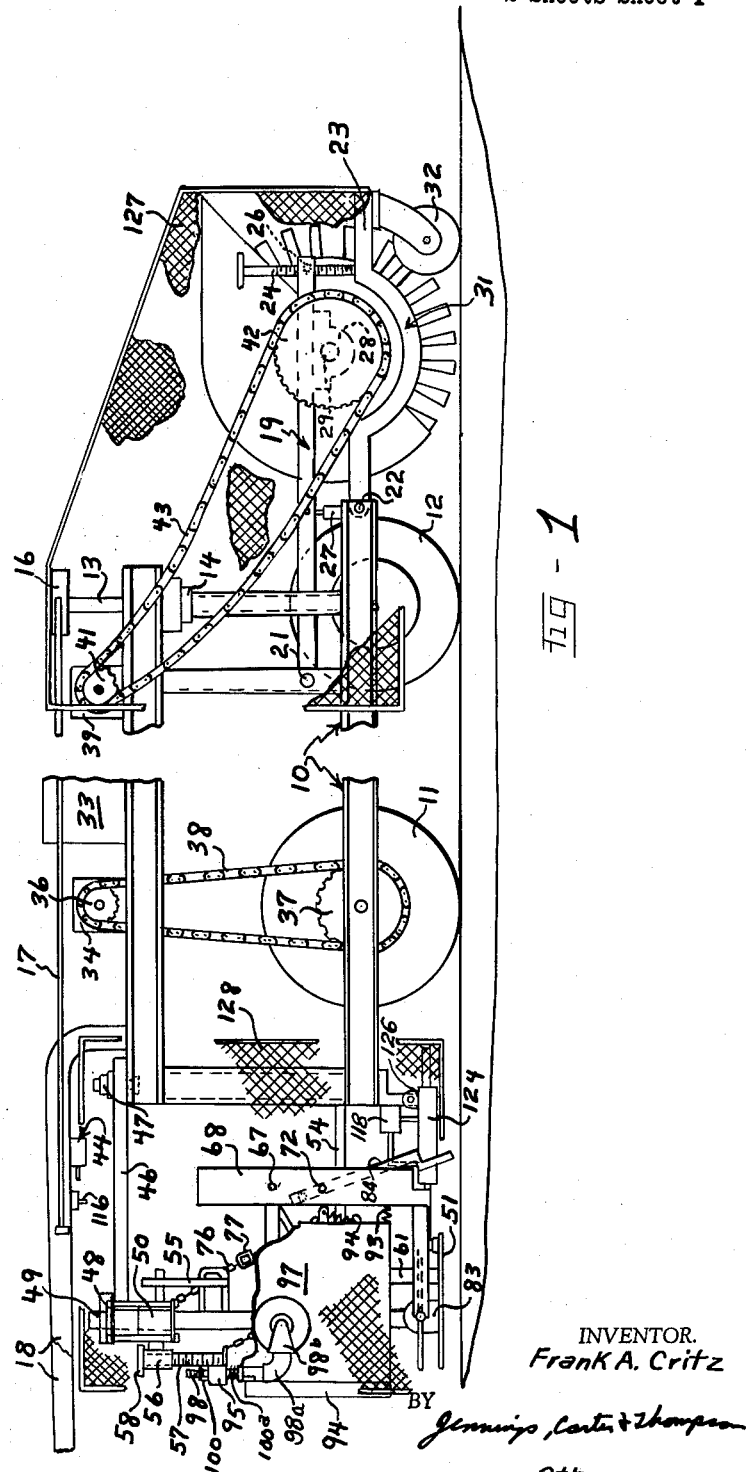

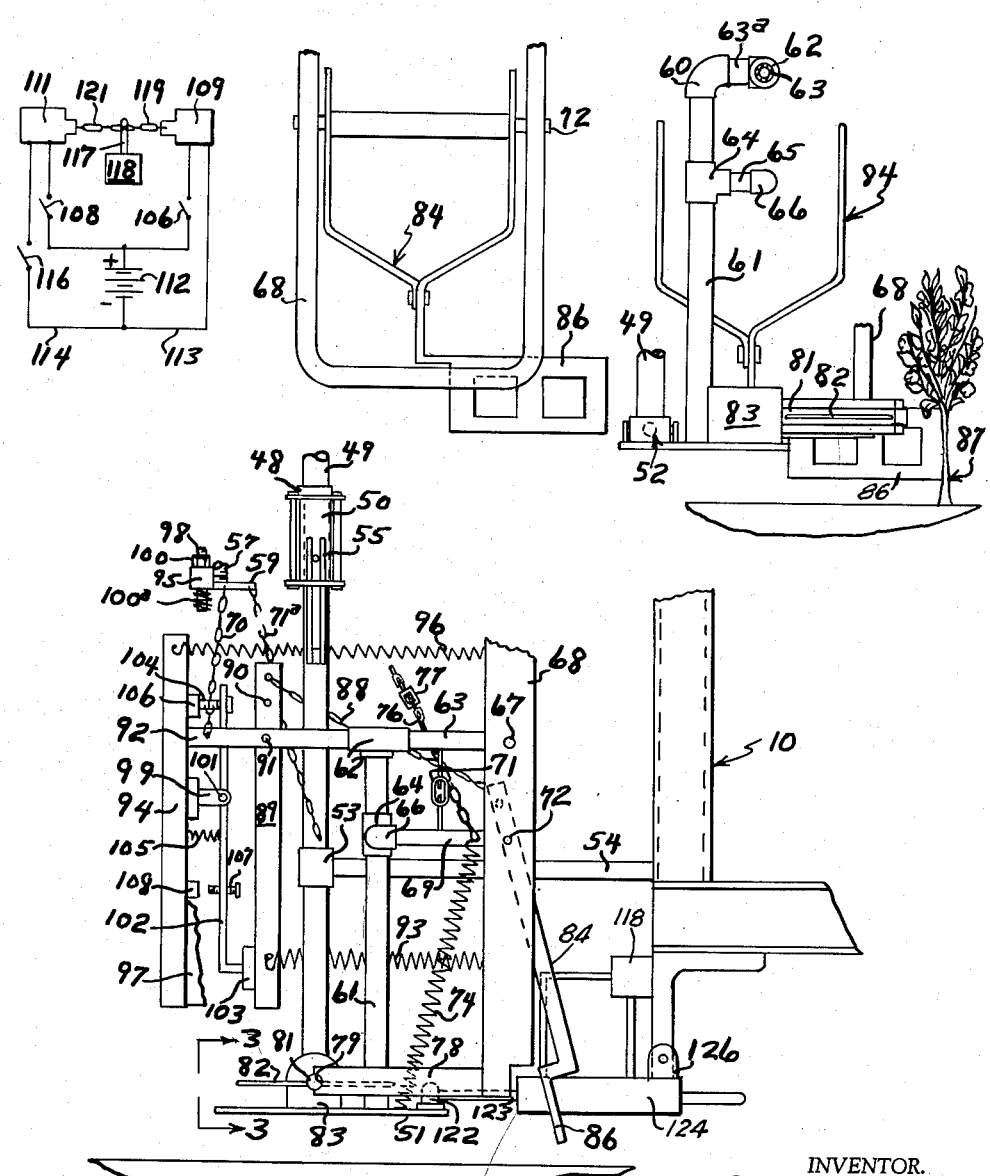

2,974,732
ROW CULTIVATOR
Frank A. Critz, West Point, Miss.
Filed Apr. 7, 1958, Ser. No. 726,811
4 Claims. (Cl. 172—6)

This invention relates to an agricultural row cultivator and more particularly to a cultivator adapted for use in chopping out grass, weeds and other vegetable matter, which might hinder the growth of planted crops, such as cotton and the like.

Another object of my invention is to provide an automatic row cultivator which shall embody rotary choppers, the position of which is controlled automatically by the plant itself, whereby the choppers are adapted to chop grass and the like up to the plant without chopping or injuring the plant.

Another object of my invention is to provide an automatic row cultivator of the character designated which shall be adapted for adjustment to the contour of the ground whereby the cultivator is adapted for use on sloping ground as well as level ground.

Another object of my invention is to provide a row cultivator of the character designated in which the means for controlling the position of the rotary choppers is adjustable vertically whereby the control means is adapted to pass over grass or the like or contact the tops thereof whereby the grass provides insufficient resistance to actuate the control member, the control member being actuated by the relatively taller plant being cultivated, such as cotton and the like.

A further object of my invention is to provide an automatic row cultivator which shall be simple of construction, economical of manufacture and one which is adapted for cultivating row crops in an efficient manner with a minimum of labor.

Briefly, my improved row cultivator comprises a translatable frame adapted for longitudinal movement alongside a row of plants to be cultivated. A ground engaging cutter is mounted on the frame in position to chop grass and the like from around the plants as the translatable frame is moved forward. A control member is mounted on the frame in position to engage the plants being cultivated when the rotary cutter approaches the plants. The control member is operatively connected to actuating means which moves the cutter away from the plants upon engagement of the control member with the plants and moves the cutter towards the plants upon disengagement of the control member with the plants.

Apparatus embodying features of my invention is illustrated in the accompanying drawings, forming a part of this application, in which:

Fig. 1 is a side elevational view;

Fig. 2 is an enlarged fragmental view, broken away and in section, showing my improved chopper assembly;

Fig. 3 is a fragmental view taken generally along the line 3—3 of Fig. 2;

Fig. 4 is a rear elevational view of the control member; and,

Fig. 5 is a diagrammatic wiring diagram showing an electrical circuit which may be associated with my apparatus.

Referring now to the drawings for a better understanding of my invention, I show a translatable frame 10 which is supported by rear wheels 11 and a front wheel 12. As shown in Fig. 1, the front wheel 12 is mounted on a vertical shaft 13 which is adapted for rotation in suitable bearings 14, whereby the wheel 12 may be turned to control the path of movement of the apparatus. Secured to the upper end of the shaft 13 is a transverse bar 16 which is connected at opposite ends to longitudinally extending rods 17 terminating adjacent the rear end of the frame 10.

Mounted adjacent the rear end of the frame 10 are a pair of rearwardly extending handle members 18 between which the operator walks as the frame 10 is moved forward. While I show the handles 18 as extending rearwardly in position to be controlled by a walking operator, it will be apparent that a suitable seat could be provided on the frame 10 for the operator and other control means, such as a wheel or the like, could be provided for rotating the shaft 13 whereby the front wheel 12 is turned.

Mounted adjacent the forward end of the translatable frame 10 is a movable front frame 19 which is adapted for pivotal movement about a pivot pin 21. Pivotally connected to the front end of the frame 10 by means of a pivot pin 22 is a forwardly extending member 23 which is connected to the lower end of a threaded rod 24. As shown in Fig. 1, the threaded rod 24 passes through a threaded opening 26 in the forward end of frame 19. The front frame 19 is thus held in selected positions relative to the forwardly extending member 23 by means of the threaded rod 24, whereby the front frame may be moved to adjusted positions about the pivot pin 21. The forwardly extending member 23 is supported by casters 32, as shown. The frame 19 is raised and lowered by a fluid pressure actuated member 27 which is interposed between the frame 10 and the frame 19, as shown in Fig. 1. Mounted adjacent each side of the front frame 19 are bearing members 28 for supporting a transverse shaft 29. Mounted on the shaft 29 and adapted for rotation therewith is a rotary chopper 31 which is adapted to chop grass and the like which is positioned between the rows of plants to be cultivated. However, chopper 31 does not chop the grass which is adjacent the plants, but leaves this area to be chopped by my improved chopper to be described hereinafter.

Mounted on the translatable frame 10 is a reservoir and hydraulic pump indicated generally at 33 for supplying fluid under pressure to the various operating parts of my apparatus to be described hereinafter. The wheels 11 of the translatable frame 10 are propelled by a fluid pressure operated motor 34 which is connected to the wheel 11 by sprockets 36 and 37 and a sprocket chain 38, as shown in Fig. 1. The rotary chopper 31 is driven by a fluid pressure motor 39 which is operatively connected to the shaft 29 of the chopper 31 by sprockets 41 and 42 and a sprocket chain 43. Fluid is supplied to the fluid pressure operated motors 34 and 39 by a suitable valve control unit indicated generally at 44, which may be mounted adjacent the handle members 18, as shown in Fig. 1.

In order to chop the grass and other vegetable matter from around the plants being cultivated, I provide rear chopper or cutter units now to be described. While I show only one such rear chopper unit, it will be apparent that a rear chopper unit may be mounted at each side of the translatable frame 10. Also, a plurality of such chopper or cutter units may be attached to the translatable frame 10 whereby any desired number of rows may be cultivated at the same time.

Mounted at the rear end of the translatable frame 10 is a rearwardly extending supporting bracket 46. The bracket 46 is connected to the frame 10 by a slot and bolt connection indicated at 47 whereby the lateral position of the support member 46 may be adjusted to vary the lateral position of the support member 46 relative to the frame 10. That is, the support member 46 may be adjusted laterally to accommodate various width rows of plants being cultivated. Mounted at the rear end of the support member 46 is a bearing member 48 for rotatably supporting a vertical sleeve 50 and a shaft 49. The lower end of the shaft 49 is connected to a horizontal plate 51 by means of a suitable swivel or universal joint 52 whereby the plate 51 is adapted for vertical pivotal movement relative to the shaft 49 to accommodate the plate 51 to the contour of the ground over which the apparatus is traveling. That is, the plate 51 is adapted for vertical pivotal movement relative to shaft 49, but rotates with shaft 49 due to the universal joint 52, as shown in Fig. 3. The lower end of the shaft 49 passes through a suitable bearing 53 which is supported by a bracket 54 which in turn is attached to the translatable frame 10.

Secured to the sleeve 50, as shown in Fig. 1, is a sleeve member 56 for receiving a threaded shaft 57. The shaft 57 moves up and down through the member 56 by means of a suitable threaded operating wheel 58 which engages the threads on shaft 57. The wheel 58 engages the upper surface of member 56 whereby the shaft 57 supports the entire weight of the choper unit. Since the sleeve member 56 and the shaft 57 are supported by the sleeve 50, which rotates with shaft 49, the entire chopper unit is adapted for pivotal movement as a unit. Connected to the lower end of the threaded shaft 57 is a support member 59 which is connected to the shaft 49 by a flexible connection 71ª. Secured to the plate 51 and projecting upwardly therefrom is a vertical support member 61. Preferably, the upper end of the vertical support member 61 is in the form of an L-fitting 60 having a nipple 63ª projecting outwardly from one side thereof. Connected to the nipple 63ª is a T-fitting 62 having a pipe section 63 projecting forwardly thereof.

Pivotally connected to the forward end of pipe 63 by means of a pin 67 is a vertically extending guard member 68. Secured to the support member 61 beneath the L-fitting 60 is a T-fitting 64 having a nipple 65 connected thereto. The nipple 65 is connected to an L-fitting 66 which in turn is connected to a forwardly extending pipe 69. Connecting the pipes 63 and 69 is a turnbuckle assembly 71.

The forward end of the pipe 69 is connected to the plate 51 by means of a tension spring 74 whereby the guard member 68 is urged downwardly. The forward end of the pipe section 69 is connected to the sleeve assembly 50 by means of a chain 76 having a turnbuckle 77 therein for varying the length whereby the position of the guard member 68 may be adjusted to various elevations. Secured to the lower end of the guard member 68 and projecting rearwardly thereof is a bracket 78 having a rearwardly opening recess 79 therein for receiving the outer end of a shaft 81 which carries cutter elements 82. The shaft 81 is connected to a fluid pressure operated motor 83 which is mounted on the plate 51 and rotates continuously as the apparatus is moved longitudinally of the row of plants to be cultivated.

Mounted for pivotal movement about a pin 72 on the guard member 68 is a control member 84. The lower end of the control member 84 is provided with a transverse, outwardly extending member 86 which is in position to engage the row of plants to be cultivated, indicated generally at 87, when the rotary cutters 82 approach the row of plants. The upper end of the control member 84 extends above the pivot pin 72, as shown in Figs. 2 and 4.

Connected to the upper end of the control member 84 is one end of a flexible member 88. The other end of a flexible member 88. The other end of the flexible member 88 is connected to the upper end of a lever arm 89 which is pivotally supported intermediate its ends by a pivot pin 91. The pivot pin 91 is carried by a rearwardly extending pipe 92 which is connected to the T fitting 62. The pipe 92 is connected to the support member 59 by a flexible member 70. Preferably, the upper portion of the lever arm is provided with a plurality of openings 90 for receiving the adjacent end of flexible member 88 whereby the effective length of the flexible member may be varied. Connecting the lower end of the lever arm 89 to the guard member 68 is a tension spring 93 which urges the lower end of the lever arm 89 forwardly, thereby urging the lower end of the control member 84 forwardly through the intermediary of the connection of the lever arm 89 and the control member 84 by the flexible member 88. The control member 84 is preferably formed of a relatively light material, such as aluminum or the like, whereby it is moved about its pivot pin 72 upon engagement of the member 86 with the plants 87. Shaft 49 is adapted for axial movement relative to sleeve 50, but rotates therewith due to the pin and yoke connection 55.

Secured to the rear end of the pipe section 92 is a vertically extending member 94. Connecting the upper end of the member 94 with the guard member 68 is a tension spring 96. The tension springs 93 and 96 thus hold the guard mmber 68 in a resilient manner whereby it is adapted for a limited amount of pivotal movement about the pivot pin 67. The primary purpose of the guard member 68 is to protect the relatively light control member 84. Secured to the lower end of the vertical member 94 and projecting forwardly thereof is a bracket 97. Pivotally connected to the bracket 97 and adapted for rotation relative thereto is the lower end of a rod 98. The lower end of rod 98 is welded to the female opening of a street-L 98ª. The male end of street-L 98ª engages the female end of a street-L 98ᵇ which in turn is connected to the member 97 by any suitable means. The upper end of the rod 98 is connected to a sleeve member 95 which is mounted on the member 59 to provide means for tilting the rear chopper frame whereby the plate 51 may be adjusted to accommodate itself to the contour of the ground. Suitable adjusting nuts 100 are provided on the rod 98 at opposite sides of member 95 and a coil spring 100ª surrounds rod 98 between the member 95 and the lowermost nut 100 for flexibility.

Mounted on the vertical member 94 and projecting forwardly thereof is a bracket 99. Pivotally connected to the bracket 99 by means of a pivot pin 101 is a lever arm 102 having a forwardly extending projection 103 which is adapted to be engaged by the lower end of the lever arm 89, as shown in Fig. 2, whereby the arm 102 is moved about its pivot point upon pivotal movement of the control member 84. The lower end of the lever arm 102 is urged forwardly by a compression spring 105 which is interposed between the member 94 and the arm 102 below the pivot pin 101. Mounted on the lever arm 102 above the pivot pin 101 is an adjustable contact member 104 which is adapted to actuate a switch element 106 mounted on the vertical member 94. In like manner, adjustably connected to the lever arm 102 beneath the pivot pin 101 is a contact member 107 which is adapted to contact and actuate a switch element 108 mounted on the vertical member 94.

Contact points at one side of the switch elements 106 and 108 are connected to electrical solenoids 109 and 111, respectively, as shown in Fig. 5. The contact points at the other side of the switch elements 106 and 108 are connected to one side of a battery 112. The other side of the battery 112 is connected to the solenoids 109 and 111 by leads 113, and 114, respectively. A switch 116 is provided in the lead 114 for a purpose to be described hereinafter. The electrical solenoids 109 and 111 are connected to an actuating arm 117 of a four-way valve 118 by means of flexible members 119 and 121, respectively. Valve 118 is secured to frame 10 and connected to cylinder 124 by suitable fluid lines.

Mounted on the plate 51 is an upstanding bracket 122.

Pivotally connected to the bracket 122 is one end of a piston rod 123 for a hydraulic cylinder 124. The forward end of the hydraulic cylinder 124 is pivotally secured to frame 10 by a clevis connection 126. Preferably, the piston rod 123 extends outwardly at 126. Preferably, the piston rod 123 extends outwardly of both ends of the cylinder 124 whereby the same internal area is provided adjacent opposite sides of the piston of the hydraulic cylinder 124. The four-way valve 118, which is actuated by the solenoids 109 and 111, is connected to opposite ends of the hydraulic cylinder 124 by suitable conduits whereby the hydraulic cylinder forces the rotary cutter elements 82 away from the plants 87 upon actuation of the control member 84. The four-way valve 118 is of a conventional type which directs fluid to either one side or the other of cylinder 124 at all times. In view of the fact that the operation of such a four-way valve is well understood in the art, no detailed description thereof is deemed necessary. The constant force of the fluid under pressure retains the piston of the cylinder 124 adjacent either one end or the other of the cylinder until the four-way valve is actuated to reverse the direction of flow of the fluid under pressure.

Mounted at the side of the translatable frame 10 and extending forwardly alongside the forward frame 19 is a screen 127 for protecting the rotary cutter 31 and its driving mechanism from coming in contact with portions of the plants being cultivated and other vegetable matter. Also, mounted adjacent the rear end of the translatable frame is a screen 128 which protects the rear chopper frames from coming into contact with the plants being cultivated and other vegetable matter. It will be apparent that where rear chopper frames are mounted at each side of the frame 10, two such screens 128 are employed.

From the foregoing description, the operation of my improved row cultivator will be readily understood. The rear chopper frame, whether it be one, two, or a plurality of chopper frames, is adjusted transversely whereby it is positioned in the proper relation to the row of plants 87 to be cultivated. This is done by adjusting the bolt and slot connection 47 to the proper position. The front rotary chopper 31 is then lowered into ground engaging position whereby it cultivates the central portion of the ground between the rows of plants. This is done by actuating the fluid pressure actuated member 27 whereby the casters 32 are lowered into ground engaging position. The threaded rod 24 is then turned to position the chopper 31 at the proper elevation.

With the apparatus thus adjusted, the fluid pressure motors 39 and 83 are energized whereby the rotary cutters 31 and 82 are operated continuously. The fluid pressure motor 34 is then actuated whereby the translatable frame 10 moves forwardly along the rows of plants 87 to be cultivated. With the cutter elements 82 in close proximity to the plants 87, the grass and other vegetable matter is chopped from around the plants as the apparatus moves forward. When the chopping elements 82 get too close to the plants 87, the member 86 of the control member 84 engages the plants 87, thus forcing the control member rearwardly about its pivot point 72. As the control member 84 is thus actuated, the lever arm 89 is rocked about its pivot point 91 in a direction to actuate the switch 108 by the contact point 107. At the same time, the switch 106 is opened. This causes the solenoid 111 to be energized, whereupon the flexible member 121 actuates the four-way valve 118 causing fluid to be introduced into the side of the hydraulic cylinder 124 to rotate the plate 51 and the cutter elements carried thereby in a direction to move away from the row of plants being cultivated. Preferably, the plate 51 is rotated in a direction whereby the cutter elements 82 move rearwardly and inwardly of the cutter frame. Immediately the control member 84 moves out of engagement with the row of plants 87, the spring 93 urges the control member outwardly to its original position. In this position, the switch element 106 is actuated by the contact point 104, due to the pressure exerted by spring 105, and the switch element 108 is opened. The switch element 106 thus remains closed except when the control member 84 is actuated. Upon closing the switch 106, the electrical solenoid 109 is energized, thus actuating the four-way valve 118 by the flexible member 119 to cause fluid to flow into the opposite end of the cylinder 124 whereby the plate 51 is rotated in the opposite direction, thereby causing the cutter elements 82 to move toward the row of plants 87. It will thus be seen that the switch elements 106 and 108 are alternately opened and closed due to the fact that the four-way valve directs fluid to either one side or the other of the cylinder 124, whereby the cutter elements 82 move inwardly and outwardly relative to the row of plants 87 and closely adjacent thereto, thus providing for efficient and close work of the cutter elements relative to the plants.

If it is desired to thin out the plants forming the row 87, the switch 116 is opened by the operator. The switch 116 is positioned in easy reach of the operator, as shown in Fig. 1. With the switch 116 open, the electrical solenoid 111 will not be actuated upon closing the switch element 108. Accordingly, the four-way valve will not be actuated by the member 121 to prevent the cutter element 82 from moving into engagement with the row of plants 87 even though the control member 84 engages the plants.

The plate 51 and the cutter apparatus associated therewith is adjusted in a vertical direction to accommodate the rotary cutters to the contour of the ground by adjusting the length of the threaded rod 98. That is, by shortening the threaded rod 98, the outer end of the rear cutter frame is moved upwardly pivoted on universal joint 52 of Fig. 3. On the other hand, by lengthening the threaded rod 98 the outer end of the cutter frame is lowered.

In order to pass over the grass or other vegetable matter being chopped or to contact only the top of the grass where it gives insufficient resistance to actuate the control member 84, the control member 84 is raised by turning the turnbuckle 77 in a direction to raise the control member 84 and the guard 68 therefor.

Pipes 63 and 69 form a parallel linkage which permits the guard member 68 to be raised and still maintain its vertical position relative to the cutter frame.

From the foregoing description it will be seen that I have devised an improved cultivator for row crops. By providing a rotary chopper element which continuously moves in close proximity to the plant and yet does not actually contact the plant, the grass and other vegetable matter is chopped from around the plants in a controlled manner. By providing means for adjusting the elevation of the chopper frame and the elevation of the control member, the apparatus is adapted for use on sloping ground as well as on level ground. Furthermore, by providing adjustable means adjacent the rear of the translatable frame for supporting the chopper frames, the apparatus is particularly adapted for use with row crops having various width rows.

While I have shown my invention in but one form, it will be obvious to those skilled in the art that it is not so limited, but is susceptible of various changes and modifications without departing from the spirit thereof and I desire, therefore, that only such limitations shall be placed thereupon as are specifically set forth in the appended claims.

What I claim is:

1. In a cultivator for a row of plants, a translatable frame for moving longitudinally alongside a row of plants, a cutter frame mounted for transverse adjustment on said translatable frame, means holding said cutter frame at selected positions relative to said translatable frame, a ground engaging rotatable cutter mounted on a horizontal axis and carried by said cutter frame and having blades extending generally transversely of the row of plants, a control member mounted for pivotal movement on said cutter frame and disposed to engage the plants being cultivated when said cutter approaches the plants, a fluid pressure actuated cylinder connected to said cutter frame, valve means introducing fluid under pressure adjacent opposite ends of said cylinder to move said cutter frame toward and away from the plants, means supplying fluid under pressure to said valve means, means to rotate said cutter, a first switch connected to said control member and actuated when the control member is engaged by the plants and pivoted in one direction, a second switch connected to said control member and actuated when the control member disengages the plants and is pivoted in the opposite direction, and valve actuating means connected to said switches and actuating said valve means whereby the cutter frame moves away from said plants upon actuating said first switch and moves toward said plants upon actuating said second switch.

2. A cultivator for a row of plants as defined in claim 1 in which the valve actuating means is in the form of electrical solenoids.

3. In a cultivator for a row of plants, a translatable frame for moving longitudinally alongside a row of plants, a cutter frame mounted for transverse adjustment on said translatable frame, means holding said cutter frame at selected positions relative to said translatable frame, a ground engaging cutter carried by said cutter frame, means to rotate said cutter, an elongated control member mounted for pivotal movement intermediate its ends on said cutter frame, an outwardly extending member adjacent the lower end of said control member, and extending downwardly therefrom at its outer end to engage the plants being cultivated when said cutter approaches the plants, a lever arm pivotally mounted intermediate its ends on said cutter frame, a flexible member connecting the upper end of said lever arm to the upper end of said control member, spring means connecting the lower portion of said lever arm to said cutter frame and urging the lower end of the control member toward the direction of travel of the translatable frame, a first switch element and a second switch element connected to said lever arm to be actuated alternately in response to pivotal movement of said lever arm in opposite directions, and power actuated means connected to said switches and moving said cutter frame away from said plants upon engagement of said control member with said plants and moving said cutter frame toward said plants upon disengagement of said control member with said plants 4. In a cultivator for a row of plants, a translatable frame for moving alongside a row of plants, a pair of generally horizontal supports connected to an end of said translatable frame for adjustment in a generally horizontal direction relative to said frame, a cutter frame pivotally mounted on said horizontal supports for transverse movement relative to said translatable frame, sleeves on the ends of said horizontal supports in which said cutter frame is slidably received, means to move said cutter frame vertically relative to said sleeves and said translatable frame, a ground engaging cutter carried on the lower end of said cutter frame, means to rotate said cutter, an elongated control member mounted on said cutter frame for pivotal movement intermediate its ends, an outwardly extending member adjacent the lower end of said control member to engage the plants being cultivated when said cutter approaches the plants, a lever arm pivotally mounted intermediate its ends on said cutter frame, a flexible member connecting the upper end of said lever arm to the upper end of said control member, spring means connecting the lower portion of said lever arm to said cutter frame and urging the lower end of the control member toward the direction of travel of the translatable frame, a first switch element and a second switch element connected to said lever arm to be actuated alternately in response to pivotal movement of said lever arm in opposite directions, and fluid pressure means pivotally connected at one end to said translatable frame and pivotally connected at the other end to said cutter frame to permit said cutter frame to move transversely relative to said translatable frame, said fluid pressure means being connected to said switches and actuated when one of said switches is closed by engagement of said control member with said plants to move said cutter frame away from the plants and actuated when the other of said switches is closed by movement of the control member away from the plants to move the cutter frame toward said plants.

References Cited in the file of this patent

UNITED STATES PATENTS

| | | |
|---|---|---|
| 1,307,672 | Johnson | June 24, 1919 |
| 2,438,224 | Marihart | Mar. 23, 1948 |
| 2,489,633 | Fulgham | Nov. 29, 1949 |
| 2,608,146 | Lund | Aug. 26, 1952 |
| 2,749,824 | Friday | June 12, 1956 |
| 2,755,721 | Rusconi | July 24, 1956 |
| 2,804,004 | Hubalek et al. | Aug. 27, 1957 |

FOREIGN PATENTS

| | | |
|---|---|---|
| 63,790 | Denmark | July 23, 1945 |